(12) United States Patent
Platet et al.

(10) Patent No.: US 8,740,097 B2
(45) Date of Patent: Jun. 3, 2014

(54) SINGLE-CONTROL THERMOSTATIC CARTRIDGE AND MIXER FAUCET INCLUDING SUCH A CARTRIDGE

(75) Inventors: Emmanuel Platet, Lardy (FR); William Da Silva, Ollainville (FR)

(73) Assignee: Vernet, Ollainville (FR)

( * ) Notice: Subject to any disclaimer, the term of this patent is extended or adjusted under 35 U.S.C. 154(b) by 545 days.

(21) Appl. No.: 13/140,737

(22) PCT Filed: Dec. 21, 2009

(86) PCT No.: PCT/FR2009/052649
§ 371 (c)(1),
(2), (4) Date: Jun. 17, 2011

(87) PCT Pub. No.: WO2010/072966
PCT Pub. Date: Jul. 1, 2010

(65) Prior Publication Data
US 2011/0240155 A1    Oct. 6, 2011

(30) Foreign Application Priority Data
Dec. 22, 2008  (FR) ...................................... 08 58953

(51) Int. Cl.
*G05D 23/185* (2006.01)
(52) U.S. Cl.
USPC ...................................................... 236/12.11
(58) Field of Classification Search
CPC .............. G05D 23/13; G05D 23/1306; G05D 23/1312; G05D 23/134; G05D 23/1346; G05D 23/1353
USPC ........................... 236/12.1, 12.11, 12.15, 12.2
See application file for complete search history.

(56) References Cited

U.S. PATENT DOCUMENTS

| 4,407,444 A | 10/1983 | Knebel |
| 4,674,678 A | 6/1987 | Knebel et al. |

(Continued)

FOREIGN PATENT DOCUMENTS

| EP | 1048997 A | 11/2000 |
| EP | 1235129 | 8/2002 |

(Continued)

*Primary Examiner* — Marc Norman
(74) *Attorney, Agent, or Firm* — Dowell & Dowell, PC

(57) ABSTRACT

According to the invention, the cartridge (1) includes a thermostatic element (72) which is thermally activated by a mixture of a cold fluid and a hot fluid, which is mechanically connected to a regulator slide (70) and which is moved by a single lever (50) for controlling the flow rate and the temperature of said mixture. In order to improve cartridge temperature regulation within a large flow range, the cartridge includes second (30) and third discs (40) in addition to a first disc which is stationary relative to the cartridge body (10). The second disc is translationally stationary relative to the first disc and is capable of rotation under the action of the lever actuation via a nut partially containing a thermostatic-member-moving assembly (76, 78, 80) which is rotatably connected to the control lever about the axis (X-X) and which is provided with extensions (66) that engage mechanically with the second disc for rotating same. The third disc is rotatably connected to the second disc and is capable of translation under the action of the lever actuation. The third disc defines: (a) a cold fluid passage (41A) designed to establish a communication between an inlet (21A) and a return line (22A) for cold fluid, formed through the first disc via an inlet (31A) and a return line (32A) for cold fluid extending through the second disc in order to enable a high flow rate; and (b) a hot fluid passage (41B) designed to establish a communication between an inlet (21B) and a return line (22B) for hot fluid, formed through the first disc via a hot fluid inlet (31*b*) and a return line (32B) also extending through the second disc in order to enable a high flow rate.

12 Claims, 6 Drawing Sheets

(56) References Cited

U.S. PATENT DOCUMENTS

| | | | |
|---|---|---|---|
| 5,462,224 A * | 10/1995 | Enoki et al. | 236/12.13 |
| 5,927,597 A | 7/1999 | Bolgar et al. | |
| 6,257,493 B1 | 7/2001 | Chamot et al. | |
| 6,517,006 B1 | 2/2003 | Knapp | |
| 6,557,770 B2 * | 5/2003 | Mace et al. | 236/12.1 |
| 6,648,234 B2 | 11/2003 | Frankholz | |
| 6,676,025 B2 | 1/2004 | Ginter et al. | |
| 7,770,808 B2 * | 8/2010 | Ruga et al. | 236/12.2 |
| 7,905,424 B2 * | 3/2011 | Li et al. | 236/12.18 |
| 8,074,893 B2 | 12/2011 | Mace | |
| 8,376,241 B2 | 2/2013 | Green et al. | |
| 2003/0234295 A1 | 12/2003 | Mace et al. | |
| 2008/0156890 A1 | 7/2008 | Le Clanche et al. | |

FOREIGN PATENT DOCUMENTS

| | | |
|---|---|---|
| EP | 1376292 A | 1/2004 |
| FR | 2586784 A | 3/1987 |
| SU | 1246063 | 7/1986 |
| WO | 9626475 A | 8/1996 |

* cited by examiner

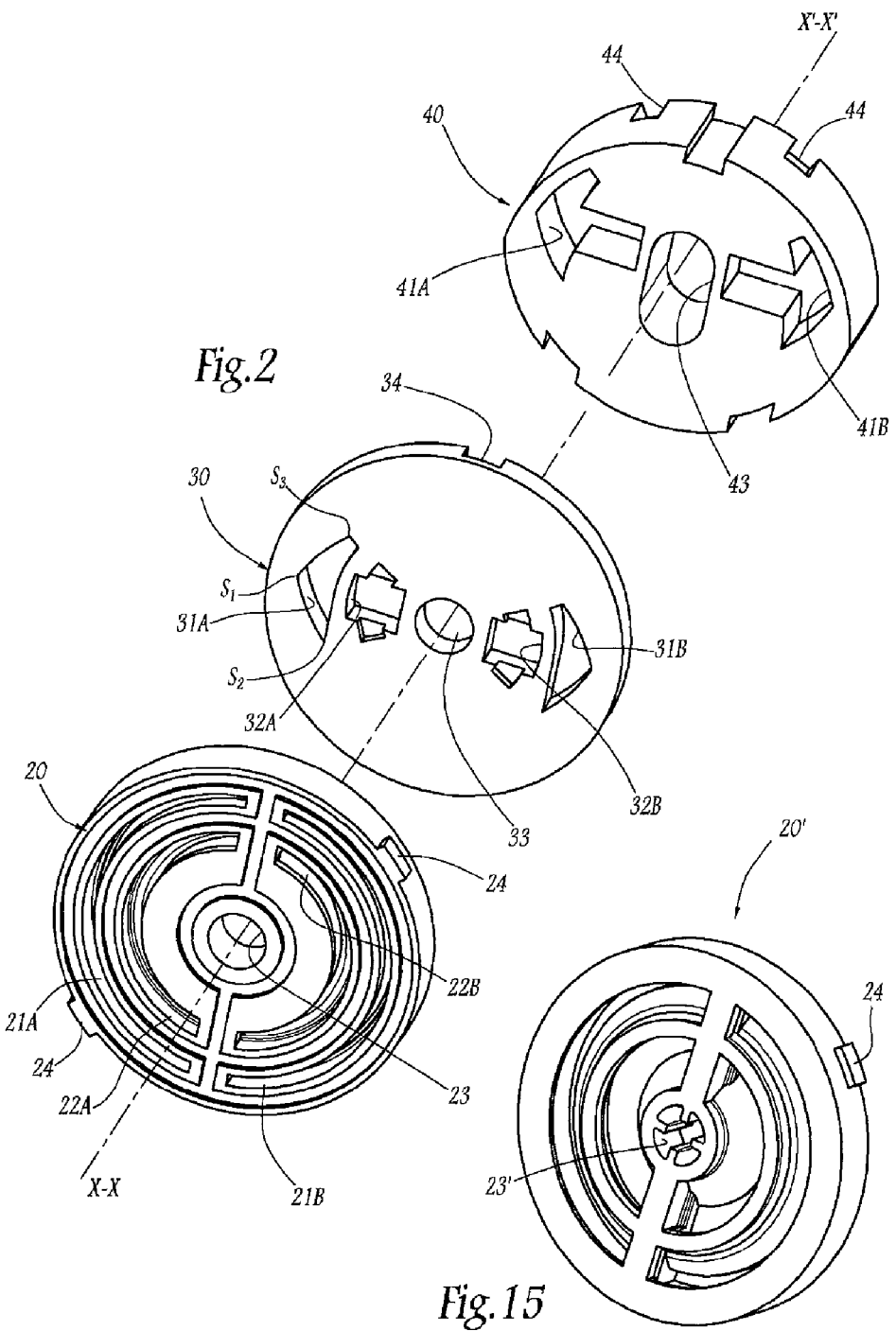

SINGLE-CONTROL THERMOSTATIC CARTRIDGE AND MIXER FAUCET INCLUDING SUCH A CARTRIDGE

The present invention relates to a single-control thermostatic cartridge, as well as a mixer faucet comprising such a cartridge.

Today, numerous sinks, washbasins and showers are equipped with mixer faucets inside which a ceramic disk cartridge is arranged. By manipulating a handle, the user controls the relative position of the disks such that a quantity of cold water supplying the faucet and a quantity of hot water also supplying this faucet are mixed before leaving the faucet. In this way, the user regulates in an approximate fashion the flow rate and the temperature of the mixture of cold and hot water.

However, when there is a large or sudden variation in the pressure and/or the temperature of one of the entering fluids, the cartridges of this type are incapable of effectively stabilizing the temperature of the fluid that leaves the faucet. WO-A-96/26475 has thus proposed to integrate a thermostatic element into this kind of cartridge. In order to do this, two ceramic disks are superposed: the lower disk is traversed by two inlets, for cold fluid and hot fluid respectively, and by two exhausts, for cold fluid and hot fluid respectively, whilst the upper disk is arranged such that it can move, relative to the lower disk, both in rotation about a central axis of the cartridge and in translation radially to this axis, such that, depending on the position of the upper disk, a passage for cold fluid and a passage for hot fluid, delimited in this upper disk, bring the inlet into communication with the exhaust for cold fluid and the inlet into communication with the exhaust for hot fluid of the lower disk, respectively. By means of a single control lever, the user regulates the flow rate and the temperature of the mixture of cold and hot water, driving the upper disk in rotation and in translation, whilst displacing a thermostatic element which is mechanically connected to a regulator slide situated downstream of the lower disk. The cartridge obtained is thus termed a "single-control thermostatic" cartridge.

However, the geometry of this cartridge, in particular the relative arrangement of the inlets and exhausts for the cold and hot fluids, limits both the available diameter for the regulator slide and the flow cross-sections of the fluids through the cartridge. As the flow rates of the fluids to be mixed are low, a small flow around the thermostatic element results, and hence poor temperature regulation which is incompatible with the standards in force for thermostatic faucets, and a low outlet flow rate also results which limits the range of possible applications. These disadvantages are all the more marked when it is attempted to dimension this cartridge so that it can be integrated into standardized mixer faucets, in other words when the cartridge has an external diameter of 40 mm, so as to replace an unregulated cartridge with a thermostatically regulated cartridge.

EP-A-1 376 292, which was filed in the name of the current applicant and which discloses a cartridge as claimed in the pre-characterizing clause of claim 1, provided a solution to this problem by altering the arrangement of the inlets and the exhausts for the cold and hot fluids of the stationary disk of the cartridge.

For their part, U.S. Pat. No. 4,407,444 and FR-A-2 586 784 propose mixer faucets in which the body is provided on the inside with a structure of three superposed ceramic disks. The teaching of these documents can, however, not be transposed to the field of the invention, in other words the field of cartridges with a single control lever as, in U.S. Pat. No. 4,407,444 and in FR-A-2 586 784, the flow rate of the mixture of cold and hot fluids is controlled by a unit which is completely separate from another unit which makes it possible to control the temperature of this mixture. With regard to the presence of these two separate control units, the internal arrangements of these faucets take up a particularly large amount of space and are incompatible with the structural constraints of a thermostatic cartridge.

The object of the present invention is to provide a single-control thermostatic cartridge which effectively regulates the temperature within a wide range of flow rates, in particular when the cartridge has an external diameter of 40 mm.

To this end, the subject of the invention is a single-control thermostatic cartridge as defined in claim 1.

The concept on which the invention is based is to replace the known systems having two superposed disks with a system having three superposed disks. As in the existing cartridges, the first disk is completely stationary in the cartridge so that the second and third disks of the cartridge according to the invention correspond, more or less, to the second disk of the existing cartridges. Because the abovementioned second disk is replaced with the second and third disks according to the invention, it is possible for each of these second and third disks to limit the size constraints in terms of the arrangement of the through passages for cold fluid and hot fluid in these disks. Indeed, by virtue of these second and third disks, it is possible to dissociate, on the one hand, the movements of one of these two disks linked with the regulation of the temperature of the mixture of the cold and hot fluids, and, on the other hand, the movements of the other disk linked with the regulation of the flow rate of this mixture. In practice, the second disk is stationary in translation such that the capacity of this disk for displacement exclusively in rotation relative to the first disk is exploited in order to delimit wide inlets and exhausts for cold fluid and hot fluid, the rotating movements of this second disk being associated with corresponding displacements of the thermostatic element for the purpose of thermostatically regulating the cartridge. Similarly, the third disk, which is linked in rotation to the second disk such that it automatically follows the rotating movements of the second disk, has a capacity for being driven exclusively in translation relative to the second disk so as to control the flow rates of cold fluid and hot fluid which are delivered into the fluid exhausts of the second disk, independently of the thermostatic regulation.

The movements of these second and third disks are controlled by a single lever associated with an elaborate nut: the lever can act directly on the third disk in order to control the translational movements of the latter, whilst it acts via the nut on the second disk in order to control the rotating movements of the latter, whilst linking these two disks in rotation with each other.

The cartridge according to the invention can thus be traversed by a sufficiently high flow rate, including when its external diameter is 40 mm, in particular in order to comply with the standard NF077, in other words to permit a flow rate of at least 12 liters/minute with category "A" resistance.

Advantageous features of the cartridge according to the invention, taken in isolation or in any technically possible combination, are specified in the dependent claims 2 to 9.

The subject of the invention is also a mixer faucet as defined in claim 10.

The invention will be better understood on reading the following description given purely by way of example and made with reference to the drawings, in which:

FIG. 2 is an exploded perspective view of three disks belonging to the cartridge from FIG. 1;

FIG. 15 is a perspective view of an alternative embodiment of one of the three disks, shown on its own.

Figure 1:
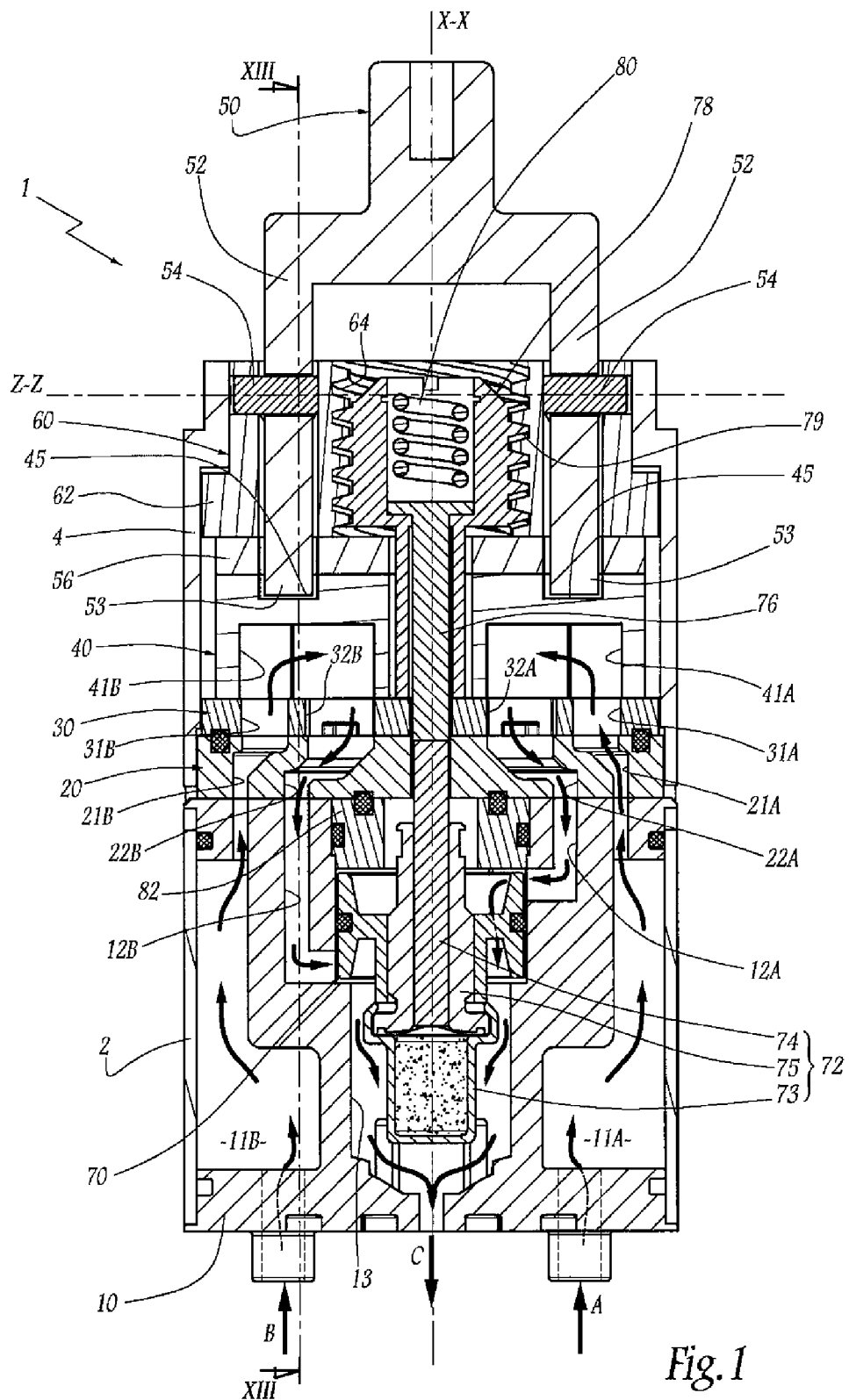
FIG. 1 is a longitudinal cross-section of a thermostatic cartridge according to the invention.

A thermostatic cartridge 1 is shown in FIG. 1 which extends longitudinally about a central axis X-X and is intended to equip a mixer faucet for water. The following description is made on the basis of the lower part of the cartridge being that shown in the lower part of FIG. 1.

The cartridge 1 has lower 2 and upper 4 tubular outer casings which are centered on the axis X-X and immobilized coaxially with each other.

A cartridge body 10 which has an external shape that is cylindrical overall, about the axis X-X, and has a circular base, is housed inside the casing 2. Over its entire length, in other words in the direction of the axis X-X, this body 10 delimits a cold water inlet duct 11A and a hot water inlet duct 11B. The body 10 also delimits, just in its upper part, a cold water return duct 12A and a hot water return duct 12B, these ducts 12A and 12B opening out, at their lower end, into a mixing chamber 13 centered on the axis X-X. The ducts 11A, 11B, 12A and 12B are positioned angularly and radially relative to the axis X-X so that they do not communicate directly with each other. Furthermore, during operation the ducts 11A and 11B are provided so that they are supplied with cold water and hot water respectively, from the lower end of the cartridge body 10, as indicated by the arrows A and B, whilst the lower end of the chamber 13 evacuates the mixture of cold and hot water contained therein, in the form of mixed water C, also through the lower end of the body 10.

In order to be able to discharge all or some of the cold water and the hot water from the inlet ducts 11A and 11B to the return ducts 12A and 12B, the cartridge 1 has three superposed ceramic disks shown on their own in FIG. 2, namely a lower disk 20, an intermediate disk 30 and an upper disk 40.

The disk 20 is assembled fixedly on the cartridge body 10, centered on the axis X-X. It is thus retained by the casing 4 both in translation radially to the axis X-X, since its external diameter is substantially equal to the internal diameter of the casing, and in rotation about the axis X-X, here for example by means of two projections 24 which extend radially outwards from the periphery of the disk 20 in a diametrically opposed fashion and which are accommodated in complementary notches (not visible in the figures) formed inside the casing 4.

As can be clearly seen in FIG. 2, the disk 20 is provided with multiple internal through passages which are positioned so that they do not communicate directly with one another in the disk. More precisely, the disk 20 is traversed both by a cold water inlet 21A, by a hot water inlet 21B, by a cold water exhaust 22A, by a hot water exhaust 22B and by a cylindrical orifice 23 with a circular base, centered on the axis X-X. The inlets 21A and 21B and the exhausts 22A and 22B each extend in the disk 20 in circumferential arcs centered on the axis X-X such that, when the disk is assembled with the cartridge body 10, they open out respectively into the ducts 11A, 11B, 12A and 12B of this body. Moreover, in a longitudinal section as shown in FIG. 1, the cross-section of these inlets and exhausts is not necessarily rectangular but has a more elaborate profile in order to optimize the flows of water through the disk 20.

The disk 30 is assembled with the remainder of the cartridge 1, centered on the axis X-X whilst being stationary in translation radially to this axis, as explained in detail below. Consequently, the central axis of this disk is considered in what follows as being the axis X-X.

The disk 30 is assembled such that it is applied flat against the upper face of the disk 20. These two disks 20 and 30 have a substantially equal external diameter such that, as can be clearly seen in FIG. 1, the disk 30 is, in the same manner as the disk 20, retained by the casing 4 in translation radially to the axis X-X. However, unlike the disk 20, the disk 30 can move in rotation about the axis X-X, the controlling of the displacement in rotation of the disk 30 being specified below.

In the same way as the disk 20, the disk 30 has multiple internal through passages, shown in detail in FIG. 2, which are positioned so as not to communicate directly with one another in the disk. The disk 30 is thus traversed by a cold water inlet 31A, by a hot water inlet 31B, by a cold water exhaust 32A, by a hot water exhaust 32B and by a cylindrical orifice 33 with a circular base, centered on the axis X-X.

Figure 4:
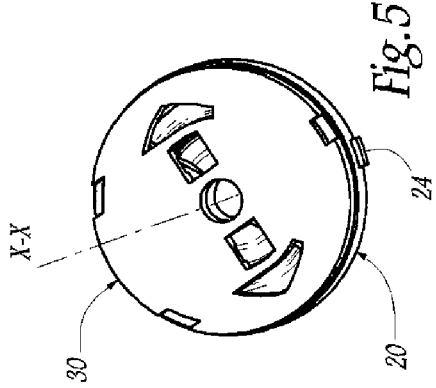
FIGS. 3 to 5 are perspective views of two of the three disks from FIG. 2, illustrating respectively three working configurations for these two disks, corresponding to three possible operating configurations for the cartridge.
Figure 5:
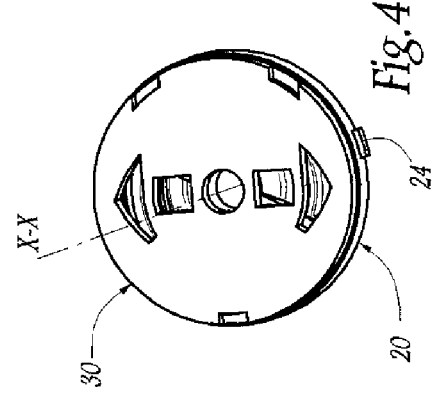
Figure 3:
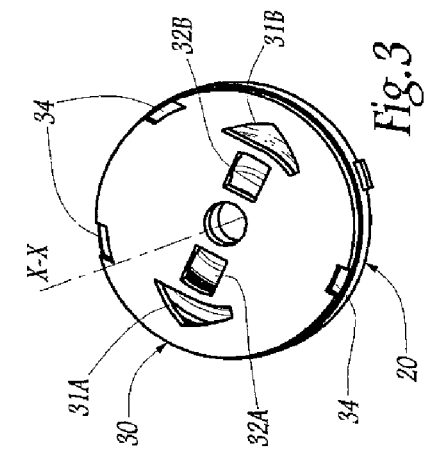

Unlike the inlets 21A and 21B of the disk 20, the inlets 31A and 31B of the disk 30 do not extend in the disk 30 and form circumferential arcs centered on the axis X-X. These inlets 31A and 32B have a more elaborate geometry: in the plane of the disk 30, each of these inlets 31A and 31B have a profile with the overall shape of an isosceles triangle, the main vertex $S_1$ (FIG. 2) of which points away from the axis X-X, whilst the two other vertices $S_2$ and $S_3$ are situated at different radial distances from the axis X-X. As a result, when the disk 30 is assembled with the remainder of the cartridge 1, in particular applied flat against the disk 20, proportionally opposite portions of the inlets 31A and 31B coincide, in the direction of the axis X-X, with the upper outflow of the inlets 21A and 21B of the disk 20, and additionally, depending on the angular position of the disk 30 relative to the disk 20, the values of the abovementioned portions vary. Thus, in the configuration of the disks 20 and 30 shown in FIG. 3, the same amount of cold water as hot water is admitted respectively into the inlets 31A and 31B from the inlets 21A and 21B respectively. On the other hand, in the configuration in FIG. 4 which is obtained by rotating the disk 30 clockwise by approximately 45° relative to the disk 20, more hot water is admitted into the inlet 31B than cold water is admitted into the inlet 31A. Conversely, in the configuration in FIG. 5 which is obtained, starting from the configuration in FIG. 3, by rotating the disk 30 anticlockwise by approximately 45° relative to the disk 20, more cold water is admitted into the inlet 31A than hot water is admitted into the inlet 31B.

For their part, the exhausts 32A and 32B extend in circumferential arcs centered on the axis X-X. In the assembled configuration of the cartridge 1, these exhausts 32A and 32B open out respectively into the exhausts 22A and 22B of the disk 20, and do so in the same respective proportions, irrespective of the angular position of the disk 30 relative to the disk 20.

Figure 7:
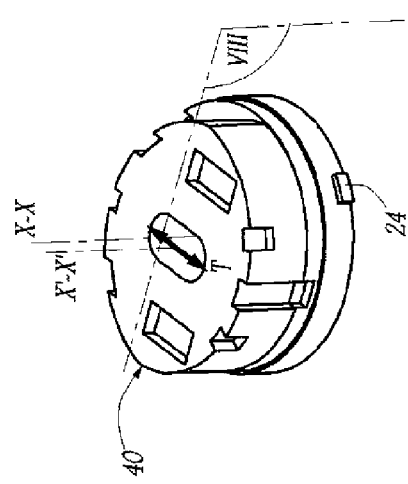
FIGS. 6 and 7 are perspective views of the three disks from FIG. 2 illustrating respectively two working configurations for these three disks, corresponding to two possible operating configurations for the cartridge.
Figure 6:
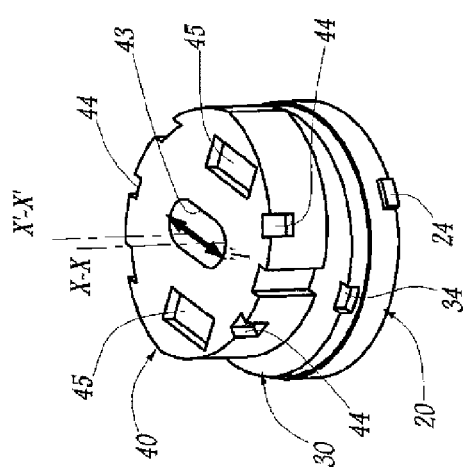

The disk 40 is assembled with the remainder of the cartridge 1, applied flat against the upper face of the disk 30. This disk 40 is able to move relative to the disk 30 in translation radially to the axis X-X such that the central axis of the disk 40, labeled X'-X', is maintained parallel with the axis X-X but at a variable distance relative to this axis X-X, it being possible for these two axes to coincide in a certain operating configuration. The direction of the translational movement of the disk 40 is indicated by the double-headed arrow labeled T in FIGS. 6 and 7. In practice, in order to allow the translational clearance between the disks 30 and 40, the radial dimension of the disk 40, measured in the direction of the translational movement T, is smaller than the diameter of the disk 30. In the exemplary embodiment in question here, the external profile of the disk 40 is not strictly circular but consists of two arcs of a circle which are symmetrical relative to the axis X'-X' and have a radius equal to that of the external profile of the disk 30, each corresponding to less than a semi-circle. As a result, when the disk 40 occupies, relative to the disk 30, either of the two extreme translated positions illustrated in FIGS. 6 and 7, respectively, half of its outer surface extends in the axial extension of that of the disk 30, whilst its other half is situated axially perpendicular to the upper face of the disk 30.

Figure 8:
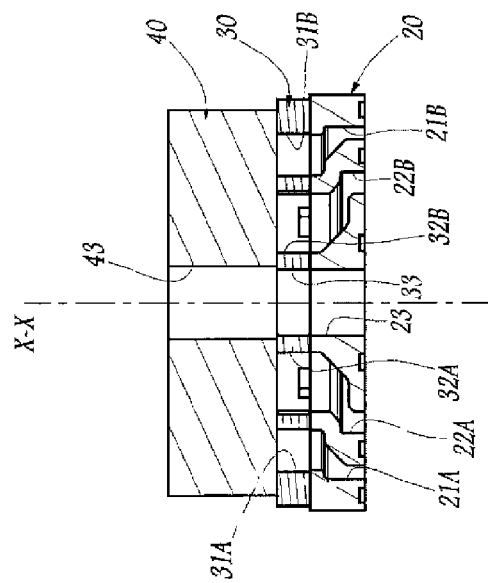
FIG. 8 is a cross-section through the plane VIII in FIG. 7.

The disk 40 delimits two internal fluid passages, namely a cold water passage 41A and a hot water passage 41B. These passages do not open out onto the upper face of the disk 40 such that they form chambers for the circulation of water inside the disk. As can be seen clearly in FIG. 2, these passages 41A and 41B have, in the plane of the disk 40, an external profile which corresponds to that which would be formed by the combination of the inlet 31A and the exhaust 32A, and the inlet 31B and the exhaust 32B respectively, including the portion of the disk 20 positioned radially between this inlet and this outlet. Consequently, when the disk 40 occupies the translated position in FIGS. 1 to 6 relative to the disk 30, its passage 41A brings the inlet 31A into complete communication with the exhaust 32A of the disk 30, whilst at the same time its passage 41B brings the inlet 31B into complete communication with the exhaust 32B: the cartridge 1 is then said to be fully open. On the other hand, when the disk 40 is in the translated position in FIGS. 7 and 8, the passages 41A and 41B are sufficiently spaced apart, in the direction of translational movement T, from the upper outflow of the inlets and exhausts 31A, 31B, 32A and 32B so that the disk 40 shuts off the circulation of water between them: the cartridge 1 is then said to be fully closed. When the disk 40 occupies an intermediate translated position between the two extreme positions in FIGS. 6 and 7, it is understood that only some of the water coming from the inlets 31A and 31B is admitted, via the passages 41A and 41B respectively, into the exhausts 32A and 32B: the cartridge 1 is thus partially open.

Figure 10:
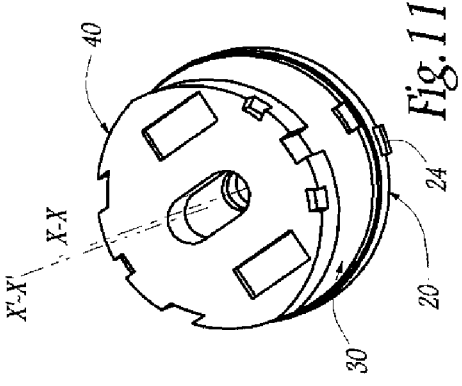
FIGS. 9 to 11 are views which are analogous respectively to FIGS. 3 to 5, illustrating the same three operating configurations as those associated with FIGS. 3 to 5, additionally showing the third disk.
Figure 11:
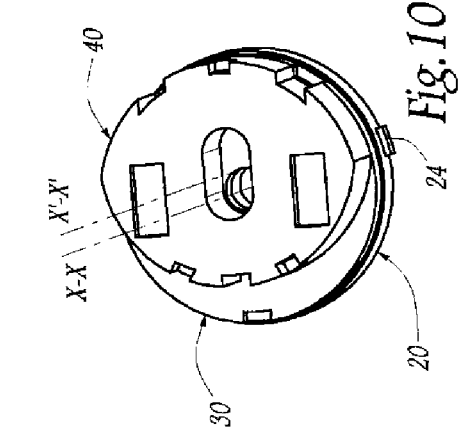
Figure 9:
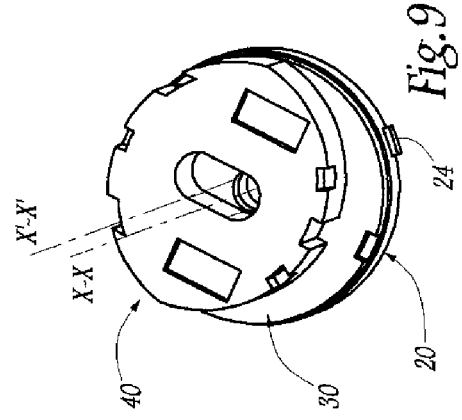

Moreover, the disk 40 is linked in rotation to the disk 30, which equates to saying that the angular position of these two disks about the axis X-X is fixed. The means which enable this relative angular immobilization will be detailed below, it having already been noted that it is understood that consequently the regulation of the angular position of the disk 30 relative to the disk 20 is independent of the regulation of the translated position of the disk 40 relative to the disk 30. This is illustrated by FIGS. 9 to 11 which show the disks 20 and 30 in the same respective configurations as FIGS. 3 to 5, with the disk 40 being shown as well, whereas the latter is in a fully open configuration.

Furthermore, for reasons specified below, the disk 40 is also traversed from one side to the other by an orifice 43 centered on the axis X'-X'. This orifice 43 is cylindrical with an oblong base, with the largest dimension of this oblong base extending in the direction of translational movement T.

Figure 12:
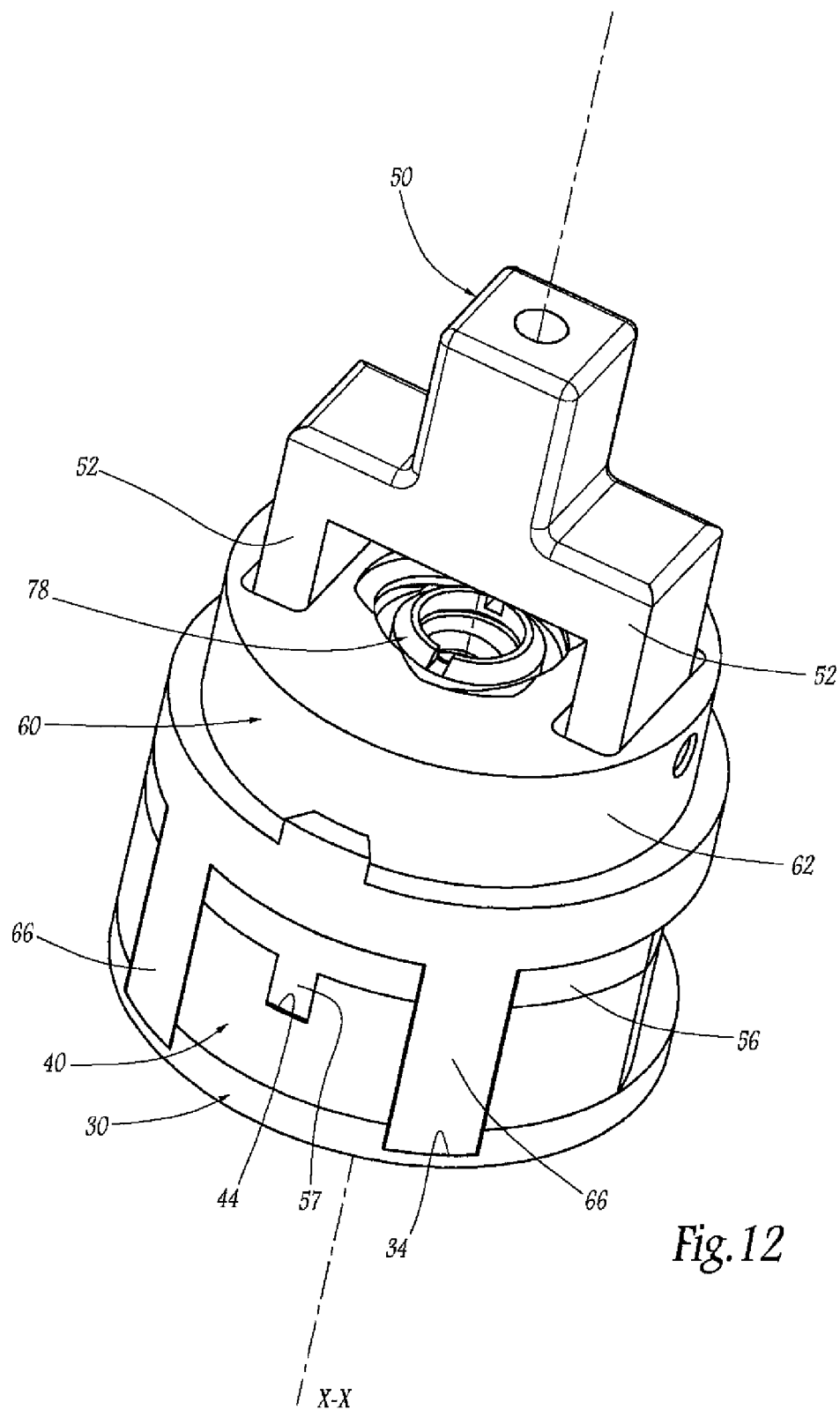
FIG. 12 is a perspective view of some of the components of the cartridge from FIG. 1.
Figure 14:
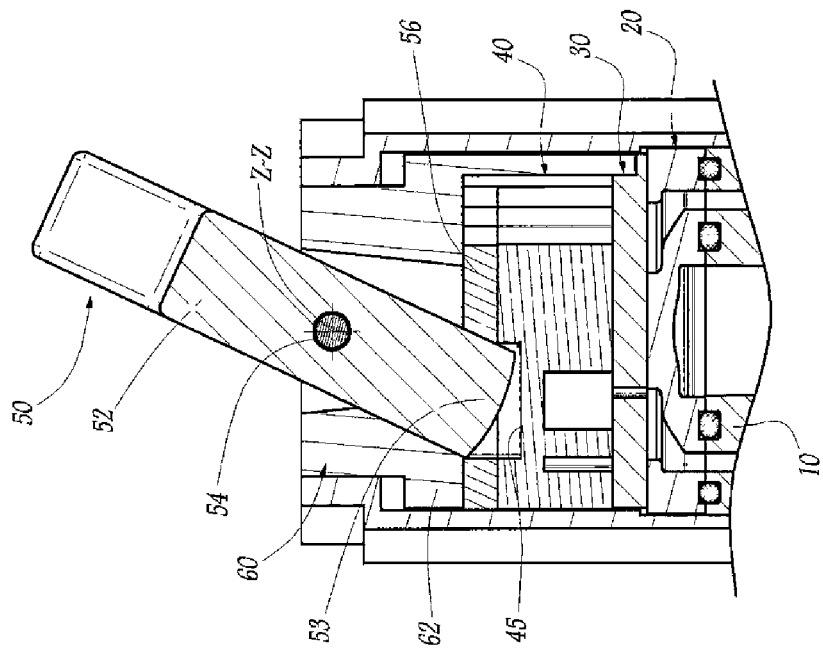
FIG. 14 is a view analogous to FIG. 13, illustrating the cartridge in the operating configuration associated with FIG. 7.
Figure 13:
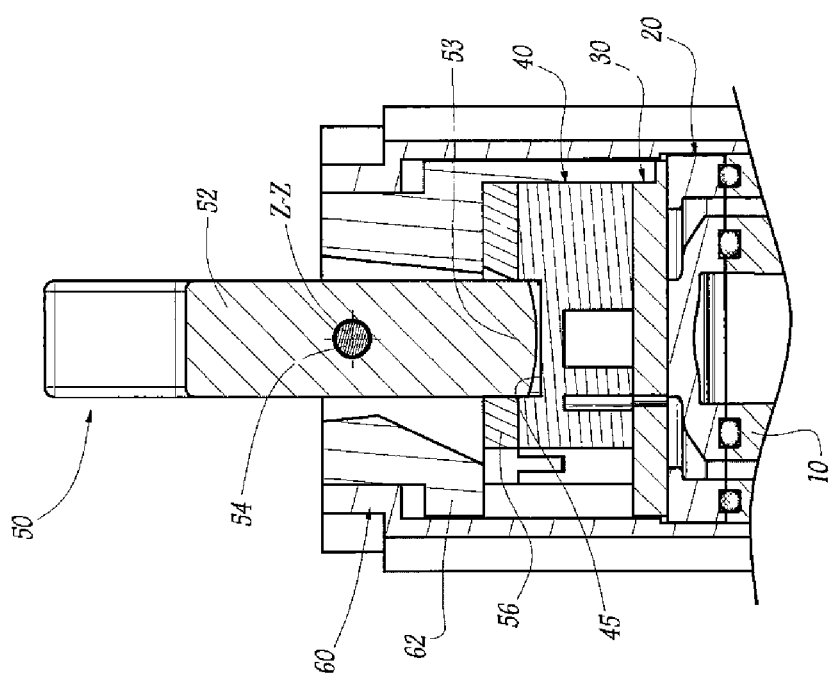
FIG. 13 is a cross-section along the line XIII-XIII in FIG. 1, this cross-section showing only some of the components of the cartridge, which essentially corresponds to those shown in FIG. 12.

In order to allow the disks 30 and 40 to be driven, the cartridge 1 has a fork-shaped control lever 50 with two parallel prongs 52, as can be seen clearly in FIGS. 12 to 14. The lower ends 53 of the prongs 52 are in direct mechanical engagement with the disk 40, whilst they are mechanically connected to the disk 30 by an elaborate nut 60. This nut 60 comprises a main body 62 which has a tubular overall shape, is centered on the axis X-X and is provided with an internal central screwthread 64. The prongs 52 of the lever 50 traverse the wall of the body 62 from one side to the other in a diametrically opposed fashion relative to the axis X-X and are assembled with the body 62 by respective pins 54, jointly aligned in a radial direction to the axis X-X, as can be clearly seen in FIG. 1. The pins 54 link the lever 50 and the nut 60 together in rotation about the axis X-X, forming an axis Z-Z for the pivoting of the lever 50 relative to the remainder of the cartridge 1, as becomes apparent on comparing FIGS. 13 and 14.

The body 62 of the nut 60 is extended downwards by three projecting tabs 66 distributed over the outer periphery of the body 62. These tabs 66 are dimensioned such that their lower end is accommodated in complementary fashion in notches 34 formed in the outer periphery of the upper face of the disk 30, these notches being visible in FIGS. 3 to 5. In the assembled state of the cartridge 1, the nut 60 consequently controls the angular position of the disk 30 about the axis X-X.

A bearing 56 is placed axially between the upper face of the disk 40 and the lower face of the body 62 of the nut 60. This bearing 56 is assembled fixedly to the upper face of the disk 40, for example here by the interaction between three notches 44 (FIGS. 2, 6 and 9 to 11) formed in the outer periphery of the upper face of the disk 40 and three complementary projections 57, one of which can be seen in FIG. 12, formed at the outer periphery of the lower face of the bearing 56. As for the upper face, it is applied flat, so that it bears in sliding fashion, against the lower face of the body 62 of the nut 60. In practice, this bearing consists of a non-stick plastic.

Moreover, the bearing 56 is traversed from one side to the other by the two prongs 52 of the lever 50 such that the lower ends 53 of the prongs are accommodated in substantially complementary notches 45 sunk into the upper face of the disk 40, as can be clearly seen in FIGS. 1 and 13. Consequently, when the lever 50 pivots about the axis Z-Z, the ends 53 of these prongs 52 push or pull the disk 40, where appropriate via the bearing 56, in the direction of translational movement T. Independently of the pivoting of the lever, the driving of the latter in rotation about the axis X-X causes the corresponding rotation of the disk 40, where appropriate via the bearing 56, by the interaction of the ends 53 of the prongs 52 with the notches 45, and where appropriate with the corresponding through holes of the bearing 56, and irrespective of the pivoted position of the lever 50.

The cartridge 1 also incorporates a thermostatic regulating function. To perform this, it has a slide 70 which is arranged in the chamber 13 of the cartridge body 10, and a thermostatic element 72 centered on the axis X-X and which includes a heat-sensitive cup 73 and a piston 74 which can be displaced in translational movement in the direction of the axis X-X under the effect of the expansion of a thermally expandable material contained inside this cup. The slide 70 is assembled fixedly with a guide sleeve 75 for the piston 74, integral with the cup 73. The free end of the piston 74 bears against a rigid rod 76 which extends upwards in the straight-line extension of the piston 74 as far as the inside of a bush 78 centered on the axis X-X and equipped with an external screwthread 79 which complements the internal screwthread 64 of the nut 60. A very stiff spring 80 is placed between the rod 76 and the bush 78: as long as the slide 70 can be displaced inside the chamber 13 without axially abutting a resistant surface, the spring 80 rigidly transmits the forces between the rod 76 and the bush 78, whilst, in the event of excessive travel of the piston 74 with the slide 70 abutting a resistant surface, the spring 80 absorbs this overtravel, thus preventing damage to the slide and/or the thermostatic element 72.

In the assembled state of the cartridge 1, the bush 78 is screw-mounted inside the body 62 of the nut 60, whilst being locked in rotation relative to the casing 4, whereas the slide 70 and the thermostatic element 72 are arranged inside the chamber 13, with partial closing of the upper end of the latter by a ring 82. The outer periphery of the slide 70 thus forms, at its lower end, a shut-off means for the downstream outflow of the duct 12A and, at its upper end, a shut-off means for the downstream outflow of the duct 12B, as shown in FIG. 1. The piston 74 and the rod 76 are accommodated in matching fashion through the central orifices 23 and of the disks 20 and 30. Similarly, the rod 76 traverses the disk 40 via its central oblong orifice 43, being matched to the smallest dimension of the cross-section of this orifice 43.

In practice, many technical solutions can be envisaged for linking the bush 78 and the casing 4 in rotation, whilst allowing the relative translational movement of the bush in the direction of the axis X-X. A first solution, not shown in detail in FIG. 1, consists of providing a direct or indirect mechanical connecting interface between the bush 78 and the casing 4, in the form of ribs oriented in the direction of the axis X-X. Another solution, illustrated in FIG. 15, is based on the use of an alternative embodiment of the lower disk, labeled 20': this disk 20' differs from the disk 20 in the other figures only in the geometry of its central orifice 23' which has a cross-section with a multi-lobed profile, here with an overall clover-leaf shape. By shaping the lower end of the rod 76 so that it complements this orifice 23', this rod is linked in rotation with the disk 20 in the assembled state of the cartridge, at the same time being able to move in translation in the direction of the axis X-X. For example via a mechanical link with axial splines between the rod 76 and the bush 78, the latter is thereby locked in rotation about the axis X-X via the disk 20', at the same time permitting its relative translational movement in the direction of this axis without the need for any additional arrangement of the casing 4.

The cartridge 1 functions as follows.

When the cartridge 1 is in the configuration in FIG. 1, cold water A enters this cartridge through the duct 11A, passes successively through the inlets 21A and 31A, circulates in the passage 41A, descends successively through the exhausts 32A and 22A and then through the duct 12A, and reaches the chamber 13 as long as the slide 70 is not shutting off the downstream outflow of this duct. Simultaneously, hot water B rises through the duct 11B, passes successively through the inlets 21B and 31B, circulates in the passage 41B, descends successively through the exhaust 32B, the exhaust 22B and the duct 12B, and pours into the chamber 13 as long as the slide 70 is not shutting off the downstream outflow of the duct 12B. At the base of the slide 70, the hot water and cold water mix, flowing around the heat-sensitive cup 73, until the mixed water C thereby obtained is removed from the cartridge 1.

The flow rate of the mixed water C is regulated by pivoting the lever 50 about the axis Z-Z: this pivoting causes the translational movement of the disk 40 in the direction T relative to the disk 30, which, as explained above, causes variation in the flow cross-sections for the hot water and cold water respectively, resulting from the positioning of the disks 30 and 40 one above the other, and this takes place between the fully open and fully closed positions of the cartridge 1.

The temperature of the mixed water C is, for its part, regulated by rotating the lever 50 about the axis X-X. This rotation jointly drives the disks 30 and 40 in rotation relative to the disk 20, and does so irrespective of the pivoted position of the lever 50. As explained above, the flow cross-sections for the hot water and the cold water respectively, resulting from the positioning of the disks 20 and 30 one above the other, are then widened by a greater or lesser degree relative to each other.

Assuming that the lever 50 is in a position fixed in rotation relative to the remainder of the cartridge 1, the thermostatic regulation operates as follows: if the temperature of the mixed water C in the chamber 13 increases, for example owing to a drop in the pressure at which the cold water is supplied, the heat-sensitive cup 73 transmits excess heat to the thermally expandable material which it contains, with the result that an additional thrust is generated between the cup 73 and the piston 74. As long as the piston 74 bears against the bush 78, via successively the rod 76 and the spring 80, the thermostatic element 72 lengthens, in other words its cup 73 moves away from its piston 74. The slide 70 is driven in a corresponding fashion inside the chamber 13, in other words at the same time it shuts off more of the downstream outflow of the duct 12B, whilst opening more of the downstream outflow of the duct 12A. Put differently, more cold water A is admitted into the chamber 13, while less hot water B can penetrate therein: the temperature of the mixed water C is thus reduced. Contrary to what has just been described, when the temperature of the mixed water is reduced, the slide 70 and the thermostatic element 72 operate in the reverse fashion. Corrections to the temperature of the mixed water thus balance out until the temperature is stabilized at a pre-set value which depends on the height reached by the piston 74.

Thus, when the lever 50 is now driven in rotation about the axis X-X, in addition to the joint movement of the disks 30 and 40 described above, the rotation of the nut 60 drives the bush 78 in translation in the direction of the axis X-X since this bush is fixed in rotation relative to the casing 4. The thermostatic element 72 is then subjected to the same translational movement, it being noted that the cup 73 tends to be displaced in translation in the opposite direction owing to the correction by the slide 70, in accordance with the principle seen above. The pitch of the internal screwthread 64 and the external screwthread of the bush 78 is adapted to allow both the regulation of the temperature of the mixed water C using the lever 50 and correction of the temperature by the electrostatic element 72 so as to impart a desired temperature to the mixed water, which temperature can be set, for example, by a graduated ring, not shown, attached to the outer face of the casing 4. In other words, the height reached by the piston 74 of the thermostatic element 72 is directly set by the position in rotation of the lever 50 relative to the remainder of the cartridge 1.

The cartridge 1 thus incorporates a thermostatic regulating function, by decoupling the regulation of the temperature of the mixed water, by virtue of the capacity of the disk 30 to be displaced exclusively in rotation relative to the disk 20, and the regulation of the flow rate of the mixed water, by virtue of the capacity of the disk 40 to be displaced exclusively in translation relative to the disk 30. An effective single-control thermostatic cartridge is thereby obtained in which the constraints on the size and positioning of the passages for the circulation of water in the disk 30 and in the disk 40 are removed. There is thus more space in the disk 30 to establish and dimension the inlets 31A and 31B and the exhausts 32A and 32B of the disk 30 than if the latter were able to be displaced in translation as well as being able to be displaced in rotation. The same applies for the passages 41A and 41B within the disk 40 if the latter were able to be displaced in rotation relative to the disk 30 as well as being able to be displaced in translation. As a result, for a given external diameter of the body 10, these inlets 31A and 31B, these exhausts 32A and 32B and these passages 41A and 41B are individually wider than if the disks 30 and 40 had the capacity for two forms of displacement. The cartridge 1 thus allows a circulation of water at a higher flow rate. In particular, the cartridge 1 conforms to the standard NF077, in other words it can be traversed by a flow rate of water at least 12 liters/minute with a category "A" resistance, whereas the external diameters of the outer casings 2 and 4, and hence that of the cartridge body 10 with the exception of the small thickness of the wall of these casings, are approximately 40 mm.

Various arrangements and alternative embodiments of the above-described cartridge 1 can moreover be envisaged. By way of example:

- the disk 20 and/or the disk 30 can be traversed by multiple cold water inlets and/or multiple hot water inlets and/or multiple cold water exhausts and/or multiple hot water exhausts; and/or
- an annular element for generating turbulence, commonly called a "turbulator", can be attached inside the chamber 13, in particular around the cup 73, in order to homogenize the temperature of the flow of the mixed water C at the outlet of the cartridge 1.

The invention claimed is:

1. A single-control thermostatic cartridge, comprising:
   a body which delimits internally a chamber for mixing a cold fluid and a hot fluid,
   a first disk which is stationary relative to the body and which delimits through it at least one cold fluid inlet, at least one cold fluid exhaust, at least one hot fluid inlet and at least one hot fluid exhaust,
   fluid communication means which can move relative to the first disk and are adapted so as to bring the cold fluid inlet into communication with the cold fluid exhaust of the first disk and as to bring the hot fluid inlet into communication with the hot fluid exhaust of the first disk,
   a regulator slide which is arranged in the chamber, downstream of the cold fluid and hot fluid exhausts of the first disk,
   a thermostatic element which is at least partially arranged in the chamber and which is mechanically connected to the regulator slide, and
   a single control lever for controlling the flow rate and temperature of the mixture of the cold and hot fluids, which is adapted so as to drive the fluid communication means in displacement relative to the first disk and as to displace the thermostatic element inside the chamber,
   wherein the fluid communication means comprise:
   a second disk which, relative to the first disk, is both stationary in translational movement radially to a central axis of the body and able to be displaced in rotation about the central axis under the driving action of the control lever via a nut in which an assembly for displacing the thermostatic element is partially accommodated, said assembly being linked to the control lever in rotation about the central axis and provided with extensions mechanically engaging with the second disk in order to drive the latter in rotation, and
   a third disk which, relative to the second disk, is both linked in rotation about the central axis and able to be displaced in translation radially to the central axis under the driving action of the control lever and which delimits both a cold fluid passage adapted so as to bring the cold fluid inlet of the first disk into communication with the cold fluid exhaust of the first disk via at least one cold fluid inlet and at least one cold fluid exhaust which are delimited through the second disk, and a hot fluid passage adapted so as to bring the hot fluid inlet of the first disk into communication with the hot fluid exhaust of the first disk via at least one hot fluid inlet and at least one hot fluid exhaust which are delimited through the second disk.

2. The cartridge as claimed in claim 1, wherein the control lever comprises at least one prong which is mounted so as to pivot on the nut and one end of which mechanically engages with the third disk so as to drive the latter in translation.

3. The cartridge as claimed in claim 2, wherein the nut comprises a body with a substantially tubular shape which is centered on the central axis, to which said at least one prong of the control lever is assembled, and from which said extensions extend, distributed over the outer periphery of this body.

4. The cartridge as claimed in claim 2, wherein, between the third disk and the nut, a bearing is placed which has a face fixedly secured to the third disk, whilst its opposite face is in sliding contact against the nut, the end of said at least one prong of the control lever traversing this bearing from one side to the other, in a substantially complementary fashion.

5. The cartridge as claimed in claim 1, wherein the assembly for displacing the thermostatic element comprises a threaded bush which is linked in rotation relative to the body, is screwed inside the nut, and against which the thermostatic element or a rigid extension thereof bears.

6. The cartridge as claimed in claim 5, wherein an overtravel spring is interposed between the threaded bush and the thermostatic element or a rigid extension thereof.

7. The cartridge as claimed in claim 5, wherein the threaded bush is linked in rotation relative to the body via the first disk.

8. The cartridge as claimed in claim 5, wherein the thermostatic element or the rigid extension thereof is centered on the central axis and traverses, from one side to the other, the first disk via a substantially complementary orifice delimited through this first disk, the second disk via a substantially complementary orifice delimited through this second disk, and the third disk via an oblong orifice delimited through this third disk, this oblong orifice having, in a section transverse to the central axis, a smallest dimension which is matched to the corresponding dimension of the thermostatic element or of the rigid extension thereof, whilst its largest dimension is oriented in the direction of translational movement of the third disk.

9. The cartridge as claimed in claim 1, wherein the body, the first disk and the second disk have substantially the same external diameter which is substantially equal to the internal diameter of an accommodating casing.

10. The cartridge as claimed in claim 9, wherein said same external diameter is approximately 40 mm.

11. The cartridge as claimed in claim 1, wherein +the cold fluid inlet and hot water inlet of the second disk substantially have, in a section transverse to the central axis, the shape of an isosceles triangle with its main vertex pointing away from the central axis.

12. A mixer faucet having a single-control thermostatic cartridge as claimed in claim 1.

* * * * *